Nov. 8, 1955     R. A. NEEL     2,722,878

CULTIVATOR ATTACHMENT

Filed March 13, 1953     2 Sheets-Sheet 1

Roy A. Neel
INVENTOR.

Roy A. Neel
INVENTOR.

United States Patent Office 2,722,878
Patented Nov. 8, 1955

2,722,878

CULTIVATOR ATTACHMENT

Roy A. Neel, Colorado City, Tex.

Application March 13, 1953, Serial No. 342,224

3 Claims. (Cl. 97—144.1)

This invention relates to new and useful improvements in mounted cultivators and/or planters, and the primary object of the present invention is to provide an attachment to the cultivator and/or planter, to plow and cultivate the third row, adjacent to the ends of cultivator frame and/or planter frame, and that by so doing, it will keep vegetation from growing in said third row. Also, said attachment can be used for the purpose of marking off the row, in order that the operator of a tractor using cultivator and/or planter will have uniform widths of said rows. The attachment will also fit on tool bar planter, as well as angle iron planter.

Another important object of the present invention is to provide a weed clearing attachment for cultivators and/or planters, embodying novel and improved mounting means for the attachment whereby the attachment may be selectively raised and lowered with respect to the cultivator and/or planter frame on which it is attached.

A further object of the present invention is to provide a weed clearing cultivator and/or planter attachment including vertically adjustable weed clearing tools which will be disposed at the ends of a cultivator and/or planter frame for the purpose of clearing weeds as the cultivator and/or planter frame is moved by a tractor on which the same is mounted.

A still further aim of the present invention is to provide a cultivator and/or planter attachment of the aforementioned character that is extremely simple and practical in construction, strong and reliable in use, efficient and durable in operation, inexpensive to manufacture, assemble and maintain, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
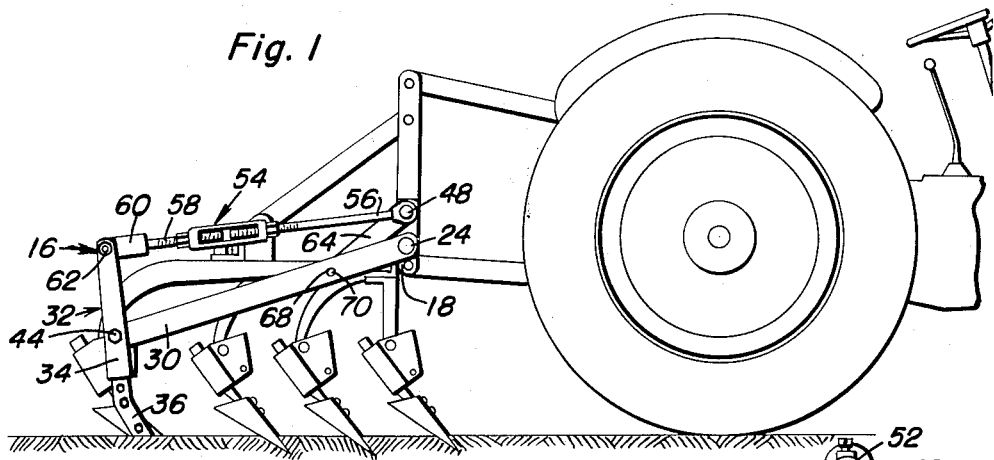
Figure 1 is a fragmentary side elevational view of a tractor to which a cultivator is applied and showing the present invention operatively connected to the cultivator frame.
Figure 4:
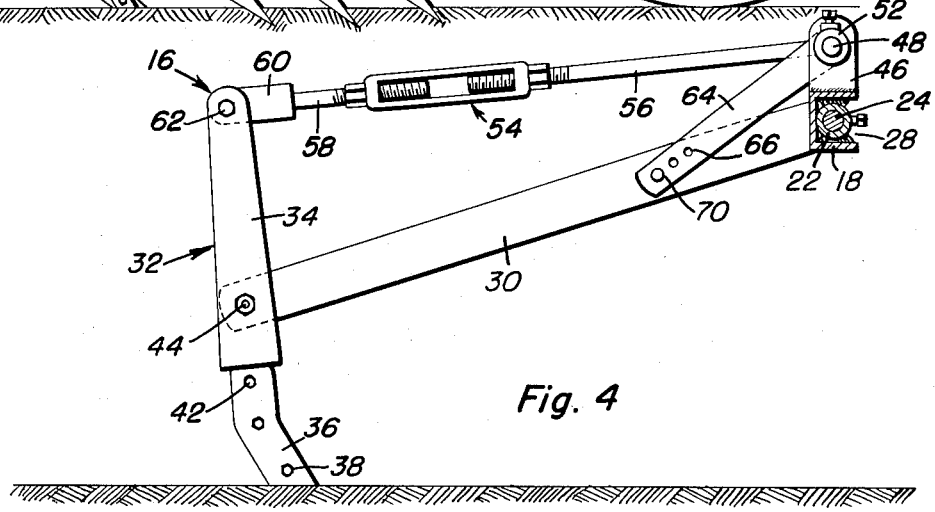
Figure 4 is an enlarged transverse vertical sectional view taken substantially on the plane of section line 4—4 of Figure 2.
Figure 5:
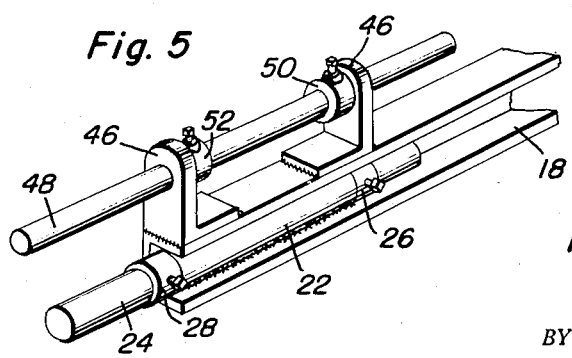
Figure 5 is a fragmentary perspective view showing the manner in which the present attachment is applied to the frame of a cultivator.

Referring now to the drawings in detail, wherein for the purpose of illustration, there is disclosed a preferred embodiment of the present invention, the numeral 10 represents a well known tractor mounted cultivator including an elongated tool holding frame 12 having a forward longitudinal angle iron bar 14.

The present invention does not attempt to claim the above conventional type cultivator, but is merely an attachment therefor which will clear weeds, ditches or the like adjacent the end rows being worked by end tools supported on the frame 12. The attachment comprises two similar units 16 that are mounted on the ends of the frame 12 to be moved with the frame 12 by a tractor T to which the cultivator is applied.

Figure 2:
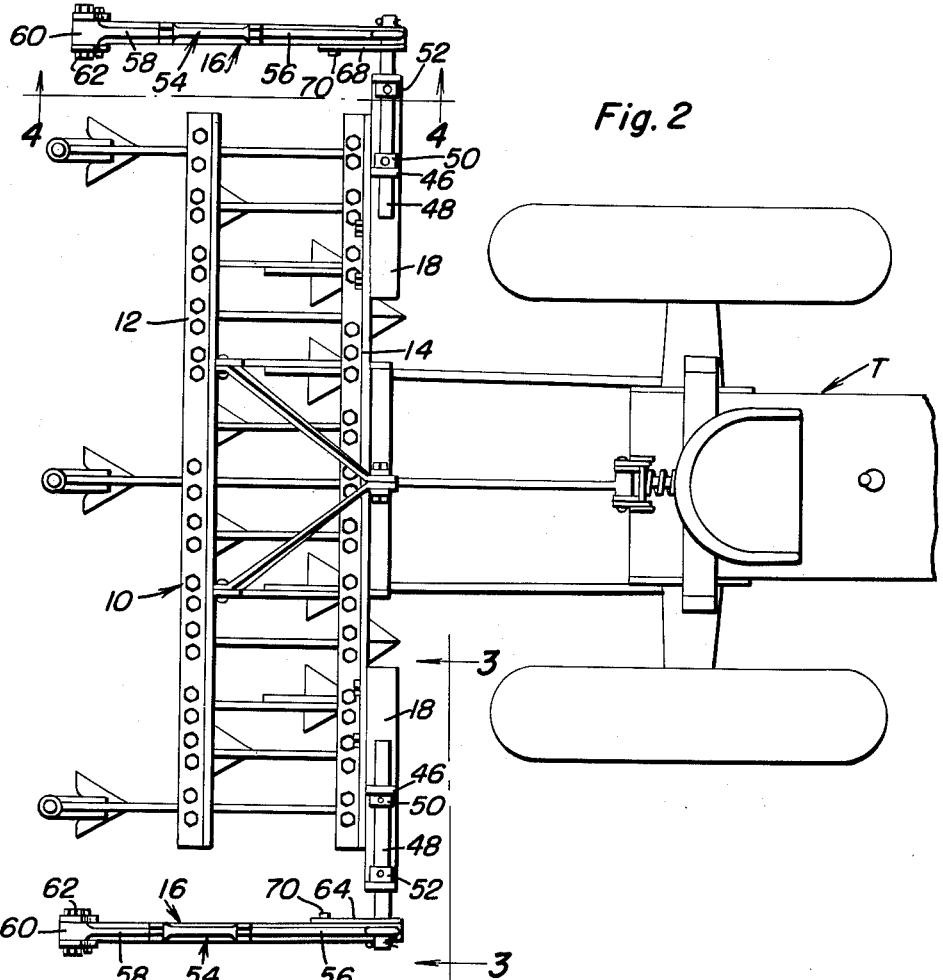
Figure 2 is a top plan view of Figure 1.
Figure 3:
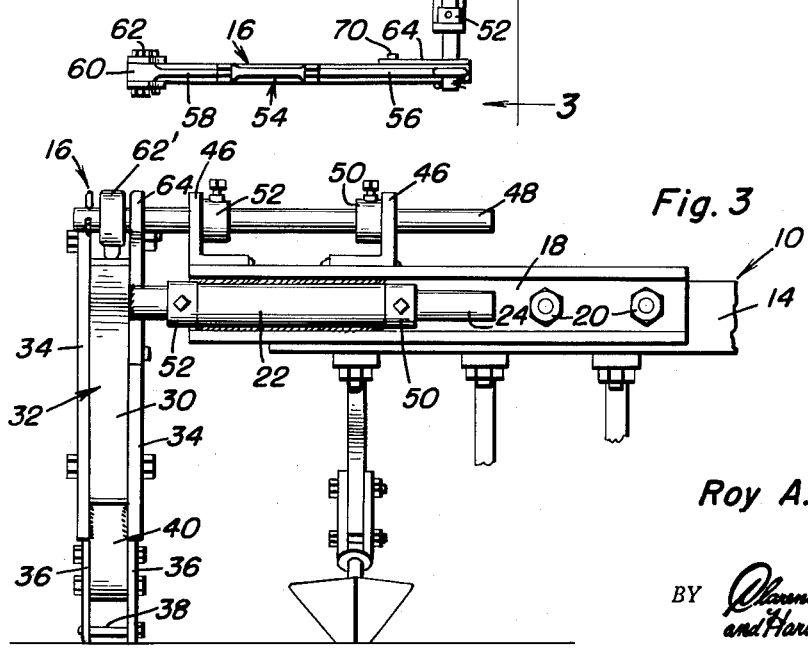
Figure 3 is an enlarged fragmentary longitudinal sectional view taken substantially on the plane of section line 3—3 of Figure 2.

Each unit 16 includes a channel-shaped mounting bar 18 having an inner end portion that is secured by bolts 20 to one end of the frame bar 14. The mounting bar 18 of one unit 16 is secured to one end of the bar 14 and the mounting bar 18 of the other unit 16 is secured to the other end of the frame bar 14. The mounting bars 18 are aligned with one another and project outwardly beyond the ends of the frame bar 14, as shown best in Figures 2 and 3 of the drawings.

Bearing tubes 22 are fixed by welding or the like within the channel-shaped mounting bars 18 and rotatably support rods 24 having inner and outer collars 26 and 28 removably secured thereon that abut the ends of the tubes 22 to restrict sliding movement of the rods 24 within the bearing tubes 22. The outer ends of the rods 24 project outwardly beyond the bearing tubes 22 and are affixed by welding or the like within apertures at the forward ends of rigid connecting links 30.

The weed clearing units 16 each include a weed clearing tool 32 composed of elongated spaced parallel shank-forming arms 34. Spaced parallel V-shaped blade elements 36 are connected and spaced at their lower portions by spacer fasteners 38. The upper end portions of the blade elements 36 overlap rigid bars 40 fixed between the lower ends of arms 34 and are secured to the bars 40 by fasteners 42. The rear ends of the connecting links 30 extend between the lower end portions of the arms 34 and are pivotally attached thereto by fasteners 44.

Means is provided for adjusting the tool 32 about the pivots 44 and relative to the connecting links 30. This means comprises a pair of angle brackets 46 that are affixed to and which extend upwardly from each of the mounting bars 18. The upstanding flanges of the brackets 46 are apertured to rotatably support shafts 48 that parallel the rods 24. Inner and outer collars 50 and 52 are removably held on the shafts 48 and engage the brackets 46 to restrict longitudinal sliding movement of the shafts 48 relative to the brackets 46.

Adjustable connecting members 54 extend between the tools 32 and the shafts 48. The connecting members 54 comprise turnbuckles having forward and rear rod sections 56 and 58. The rear rod sections 58 are fixed to short bars 60 that are pivoted, as at 62, between the upper ends of arms 34 and the forward ends of rod sections 56 terminate in eyes 62' that receive the shafts 48. In this manner, adjustment of the rod sections 56 and 58 toward each other will tilt the tools 32 clockwise with respect to the links 30, whereas adjustment of the rod sections 56 and 58 away from each other will tilt the tools 32 counter-clockwise with respect to links 30.

Means is provided for retaining the rods 24 rotatably adjusted in the bearing tubes 22. This means comprises a pair of adjusting links 64 having forward apertured ends that receive the shafts 48. The rear end portions of the adjusting links 64 are provided with longitudinally spaced apertures 66 for selectively registering with apertures 68 in the links 30. Fasteners 70 extend through apertures 68 and selected apertures 66 in order to longitudinally adjustably secure the links 64 to the links 30 and thereby restrict rotation of the rods 24 in the bearing tubes 22.

In practical use of the present invention, the mounting bars 18 are removably secured to the ends of the frame bar 14 by the bolts 20 so that the units 16 will be located outwardly from the ends of the frame 12 with the weed clearing tools 32 disposed rearwardly of the frame 12. The links 30 are selectively raised and lowered so that the tools 32 will be disposed at the desired depth, and then the fasteners 70 are extended through the apertures 68 and the apertures 66 in registry therewith in order to lock the links 30 against swinging movement. The turnbuckles 54 are adjusted in order to retain the tools 32 in a desired inclined position with respect to the links 30, depending upon the type soil or the weeds that are to be cleared by the tool 32.

The units 16 thus applied to the frame 12 will be moved with the frame 12 as the tractor T moves in a forward direction. When the frame 12 is raised by the lift mechanism of the tractor, the units 16 will also be raised from the ground inasmuch as the units 16 are supported solely by the frame 12.

As the blade-forming elements 36 are removably secured to the spacer blocks 40, by the fasteners 42, it is merely necessary to remove the fasteners 42 in order to replace or repair the blade elements 36 without the necessity of removing the entire units from the cultivator frame 12.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. For use with a cultivator and/or planter including a transversely elongated tool holding frame, a weed clearing attachment comprising a pair of mounting bars secured to the ends of said frame and extending longitudinally of the frame outwardly beyond the ends of the frame, a pair of rigid weed clearing tools having elongated upwardly extending shank portions, said weed clearing tools being disposed behind the frame, vertically swingable lower connecting members pivotally connected to the mounting bars and pivotally connecting the shank portions to the mounting bars for vertical movement of the weed clearing tools bodily and spaced outwardly of the ends of the frame to correspondingly space said shank portions, brackets fixed to and extending upwardly from said bars, upper connecting members including turnbuckles connecting the brackets to the shank portions to retain the weed clearing tools in a pivotally adjusted position, links pivotally attached to said brackets, and fastener means for attaching said links to said lower connecting members to hold said lower connecting members in vertically swung position.

2. In a tractor mounted cultivator and/or planter including a transversely elongated tool holding frame having a forward longitudinal bar, a weed clearing attachment comprising a pair of mounting bars secured to and extending outwardly beyond the ends of said longitudinal bar, a horizontal bearing tube fixed to each mounting bar, a horizontal rod rotatably positioned in each bearing tube, a pair of weed clearing tools disposed behind the frame and having upwardly extending shank portions, a pair of angle brackets fixed to and extending upwardly from each mounting bar, a shaft rotatably supported by each pair of angle brackets, rigid connecting links having forward ends fixed to said rods, horizontal pivots securing the rear ends of said links to said shank portions, means adjustably connecting the shank portions to the shafts for adjusting the shank portions about the pivots relative to the links, and a pair of adjusting links having forward ends engaged on said shaft and rear ends longitudinally adjustably connected to said connecting links to retain the rods rotatably adjusted in said tubes.

3. A weed clearing attachment for cultivator and/or planter frames, said attachment comprising a mounting bar, a bearing tube fixed to said bar, a rod received in said tube for rotation, a weed clearing tool having an upwardly extending shank portion with upper and lower ends, a rigid connecting link having a forward end fixed to said rod, a horizontal pivot between the rear end of the link and the lower end of said shank portion, a pair of angle brackets fixed to said bar and extending upwardly therefrom, a shaft rotatably supported by said brackets and paralleling said rod, a turnbuckle including forward and rear rod sections, said rear rod section being pivoted to the upper end of said shank portion and said forward rod section being pivotally engaged with said shaft, an adjusting link having a forward end pivotally engaged on said shaft and a rear end with longitudinally spaced apertures, said connecting link having an aperture therein for selectively registering with the apertures in said adjusting link, and a fastener extending through the aperture in said connecting link to rotatably adjust the rod in the bearing tube.

References Cited in the file of this patent
UNITED STATES PATENTS

| | | |
|---|---|---|
| 1,100,920 | Seay | June 23, 1914 |
| 1,962,393 | Horton et al. | June 12, 1934 |
| 2,029,249 | Noell et al. | Jan. 28, 1936 |
| 2,164,254 | Olson | June 27, 1939 |
| 2,319,047 | Fell | May 11, 1943 |
| 2,552,292 | Metz et al. | May 8, 1951 |